(12) United States Patent
Reihs et al.

(10) Patent No.: US 7,285,331 B1
(45) Date of Patent: Oct. 23, 2007

(54) ULTRAPHOBIC SURFACE

(75) Inventors: Karsten Reihs, Köln (DE); Daniel-Gordon Duff, Leverkusen (DE); Georg Wiessmeier, Köln (DE); Matthias Voetz, Köln (DE); Johan Kijlstra, Leverkusen (DE); Dieter Rühle, Odenthal (DE); Burkhard Köhler, Leverkusen (DE)

(73) Assignee: Qiagen GmbH, Hilden (DE)

( * ) Notice: Subject to any disclaimer, the term of this patent is extended or adjusted under 35 U.S.C. 154(b) by 0 days.

(21) Appl. No.: 09/869,123

(22) PCT Filed: Dec. 22, 1999

(86) PCT No.: PCT/EP99/10322

§ 371 (c)(1),
(2), (4) Date: Oct. 3, 2001

(87) PCT Pub. No.: WO00/39240

PCT Pub. Date: Jul. 6, 2000

(30) Foreign Application Priority Data

| Dec. 24, 1998 | (DE) | ............................... 198 60 134 |
| Dec. 24, 1998 | (DE) | ............................... 198 60 136 |
| Dec. 24, 1998 | (DE) | ............................... 198 60 141 |

(51) Int. Cl.
*B32B 9/04* (2006.01)
*B32B 27/36* (2006.01)
*B32B 27/00* (2006.01)
*B32B 15/04* (2006.01)
*B05D 1/18* (2006.01)

(52) U.S. Cl. ............... 428/411.1; 428/412; 428/423.1; 428/425.8; 428/457; 428/458; 428/461; 428/473.5; 428/474.4; 428/480; 428/544; 427/435

(58) Field of Classification Search ................ 427/435; 428/411.1, 412, 421, 423.1, 425.8, 457, 458, 428/461, 465, 473.5, 474.4, 480, 543, 544, 428/447

See application file for complete search history.

(56) References Cited

U.S. PATENT DOCUMENTS

| 5,277,788 | A | * | 1/1994 | Nitowski et al. | ............ 205/172 |
| 5,624,632 | A | * | 4/1997 | Baumann et al. | ............ 148/415 |
| 5,674,592 | A | * | 10/1997 | Clark et al. | ............... 427/434.4 |
| 5,693,236 | A | | 12/1997 | Okumura et al. | |
| 6,124,039 | A | * | 9/2000 | Goetz et al. | ................. 428/457 |

FOREIGN PATENT DOCUMENTS

| EP | 0 476 510 | 3/1992 |
| EP | 0 754 738 | 1/1997 |
| EP | 0 795 592 | 9/1997 |
| EP | 0 825 241 | 2/1998 |
| EP | 00825241 A1 * | 2/1998 |
| EP | 0 933 388 A2 | 8/1999 |
| WO | WO96/04123 | 2/1996 |

OTHER PUBLICATIONS

Kaoru Tsujii, Takamasa Yamamoto, Tomohiro Onda und Satoshi Shibuichi, "Superolabstobende Oberflachen", Angew, Chem 1997, 109, Nr. 9.

Kiyoharu Tadanaga, et al. "Super-Water-Repellent $Al_2O_3$ Coating Films with High Transparency," J. Am. Ceramic Soc., 80 (4) 1040-1042, 1997.

Dazufumi Ogawa, et al., "Development of a Transparent and Ultrahydrophobic Glass Plate", Jpn. J. Appl Phys. vol. 32, (1993) pp. L614-615.

W. Barthlottand C. Neinhuis, "Lotus-Effekt und Autolack: Die Selbstreinigungsfahgkeit mikro-stukturierter Oberflachen", Biologie in unserver Zeit/28. Jahg. 1998/ Nr. 5.

Falbe, et al., Rompp Chemie Lexikon,pp. 1626-1628.

Rompp, Herausgeber: Jurgen Falbe, Manfred Regitz, pp. 1649 and 1650.

Rompp Lexikon, Chemie 10., vollig uberarbeitete Auflage, pp. 135-138.

Ullmann's Enclyclopedia of Industrial Chemisty, vols. A1-A28: alphabetically arranged articles, vols. B1-B8: basic Knowledge, p. 481, 514-518.

Falbe, et al., Rompp Chemie Lexikon, 9., erweiterte und neu-bearbeitete auflage, pp. 3921-3922.

Ullmans encykoopadie der technischen Chemie, 4., neubearbeitete und erweiterte Auflage, pp. 51-54.

Satoshi Shibuichi, et al., Super Water-Repellent Surfaces Resulting from Fractal Structure, J. Phys. Chem. 1996, 100, pp. 19512-19517.

Patent Abstracts of Japan, JP 10-195348, Jul. 28, 1998.

C. Ruppe, et al., Thin Solid Films, vol. 288, No. 1, pp. 8-13, "Roughness Analysis of Optical Films and Substrates by Atomic Force Microscopy," Nov. 15, 1996.

K. L., Prime, et al., Chemical Abstracts, vol. 115, No. 9, "Self-Assembled Organic Monolayers: Model Systems for Studying Adsorption of Proteins at Surfaces," Sep. 2, 1991.

D. W. Hatchett, et al, Journal of the American Chemical Society, vol. 120, pp. 1062-1069, "Electrochemical Measurement of the Free Energy of Absorption of N-Alkanethiolates at AG(111)," Feb. 11, 1998.

* cited by examiner

*Primary Examiner*—Thao Tran
(74) *Attorney, Agent, or Firm*—Oblon, Spivak, McClelland, Maier & Neustadt, P.C.

(57) ABSTRACT

The invention relates to a structured surface with ultraphobic properties. Said surface as a surface topography in which the value of the integral of a function S: $S(\log f)=a(f) \cdot f$, which gives a relationship between the spatial frequencies f of the individual Fourier components and their amplitudes a(f) is at least 0.5 between the integration limits $\log (f_1/\mu m^{-1})=-3$ and $\log (f_2/\mu m^{-1})=3$. The surface consists of a hydrophobic or oleophobic material or is coated with a hydrophobic or oleophobic material.

27 Claims, 6 Drawing Sheets

ULTRAPHOBIC SURFACE

The present invention relates to an ultraphobic surface, to processes for its preparation and to its use. The surface has a surface topography in which the spatial frequencies f of the individual Fourier components and their amplitudes a(f) expressed by the integral of the function S $$S(\log f) = a(f) \cdot f \quad (1)$$

calculated between the integration limits $\log(f_1/\mu m^{-1})=-3$ and $\log(f_2/\mu m^{-1})=3$ is at least 0.5 and consists of a hydrophobic or, in particular, oleophobic material, or is coated with a hydrophobic or, in particular, oleophobic material.

Ultraphobic surfaces are characterized by the fact that the contact angle of a drop of liquid, usually water, on the surface is significantly more than 90° and that the roll-off angle does not exceed 10°. Ultraphobic surfaces with a contact angle of >150° and the abovementioned roll-off angle are of great use industrially because, for example, they are not wettable with oil or with water, soil particles adhere to these surfaces only very poorly and these surfaces are self-cleaning. Here, self-cleaning means the ability of the surface to readily give up soil or dust particles adhering to the surface to liquids which flow over the surface.

There has therefore been no lack of attempts to provide such ultraphobic surfaces. For example, EP 476 510 A1 discloses a process for preparing an ultraphobic surface, in which a metal oxide film is applied to a glass surface and is then etched using an Ar plasma. However, the surfaces prepared by this process have the disadvantage that the contact angle of a drop on the surface is less than 150°.

U.S. Pat. No. 5,693,236 also discloses a plurality of processes for preparing ultraphobic surfaces, in which zinc oxide microneedles are applied to a surface using a binder and are then partially uncovered in various ways (e.g. by plasma treatment). The surface structured in this way is then coated with a water-repelling composition. However, surfaces structured in this way likewise only have contact angles up to 150°.

WO 96/04123 likewise discloses processes for the preparation of ultraphobic surfaces. This patent application teaches, inter alia, to provide the desired surface structures as early as during the preparation of a moulding of hydrophobic polymers in which the mouldings are prepared from the outset in moulds whose surface has the negative of the desired surface structure. However, this procedure has the disadvantage that the negative of the desired surface structure firstly has to be prepared before an object with the desired surface structure can be moulded. During the preparation of the negative form as described above it is also possible that faults will arise in the surface, which impair the positive impression of hydrophobic polymer with regard to its surface properties.

It is therefore the object to provide ultraphobic surfaces and processes for their preparation which have a contact angle of $\geq 150°$, and preferably a roll-off angle of $\leq 10°$.

Here, the roll-off angle is the angle of inclination of a fundamentally planar but structured surface towards the horizontal at which a stationary drop of water of volume 10 µl is moved as a result of the gravitational force if the surface is inclined.

A particular problem is that the ultraphobic property is found on surfaces of very different materials having completely different surface structures, as is shown by the examples given above. Hitherto there has been no process which is able to determine the ultraphobic property of a surface irrespective of the material. A further object of the invention is therefore to find a method by which surfaces can be tested for the ultraphobic property irrespective of the material.

The object is achieved according to the invention by a structured surface having ultraphobic properties, which is characterized in that it has a surface topography in which the value of the integral of a function S $$S(\log f) = a(f) \cdot f \quad (1),$$

which gives a relationship between the spatial frequencies f of the individual Fourier components and their amplitudes a(f), is at least 0.5 between the integration limits log $(f_1/\mu m^{-1})=-3$ and $\log(f_2/\mu m^{-1})=3$, and consists of a hydrophobic or, in particular, oleophobic material, or is coated with a hydrophobic or, in particular, oleophobic material.

Within the meaning of the invention, a hydrophobic material is a material which, on a level unstructured surface, has a contact angle based on water of greater than 90°.

Within the meaning of the invention, an oleophobic material is a material which, on a level unstructured surface, has a contact angle based on long-chain n-alkanes, such as n-decane, of greater than 90°.

Said integral of the function (1) is preferably >0.6.

Preference is given to an ultraphobic surface which has a contact angle towards water of at least 150°, in particular of at least 155°.

The ultraphobic surface or its substrate preferably consists of metal, plastic, glass or ceramic material.

The metal is particularly preferably chosen from the series beryllium, magnesium, scandium, titanium, vanadium, chromium, manganese, iron, cobalt, nickel, copper, zinc, gallium, yttrium, zirconium, niobium, molybdenum, technetium, ruthenium, rhenium, palladium, silver, cadmium, indium, tin, lanthanum, cerium, praseodymium, neodymium, samarium, europium, gadolinium, terbium, dysprosium, holmium, erbium, thulium, ytterbium, lutetium, hafnium, tantalum, tungsten, rhenium, osmium, iridium, platinum, gold, thallium, lead, bismuth, in particular titanium, aluminium, magnesium and nickel or an alloy of said metals.

The metal of the ultraphobic surface is very particularly preferably an aluminium-magnesium alloy, particularly preferably $AlMg_3$.

The polymer suitable for the ultraphobic surface or its substrate is a thermosetting or thermoplastic polymer.

The thermosetting polymer is chosen in particular from the series: diallyl phthalate resin, epoxy resin, urea-formaldehyde resin, melamine-formaldehyde resin, melamine-phenol-formaldehyde resin, phenol-formaldehyde resin, polyimide, silicone rubber and unsaturated polyester resin.

The thermoplastic polymer is chosen in particular from the series: thermoplastic polyolefin, e.g. polypropylene or polyethylene, polycarbonate, polyester carbonate, polyester (e.g. PBT or PET), polystyrene, styrene copolymer, SAN resin, rubber-containing styrene graft copolymer, e.g. ABS polymer, polyamide, polyurethane, polyphenylene sulphide, polyvinyl chloride or any possible mixtures of said polymers.

The thermoplastic polymers below are particularly suitable as substrate for the surface according to the invention: polyolefins, such as polyethylene of high and low density, i.e. densities of 0.91 g/cm$^3$ to 0.97 g/cm$^3$, which can be prepared by known processes, Ullmann (4th) 19, page 167 et seq., Winnacker-Küchler (4th) 6, 353 to 367, Elias & Vohwinkel, Neue Polymere Werkstoffe für die industrielle Anwendung, Munich, Hanser 1983.

Also suitable are polypropylenes with molecular weights of from 10 000 g/mol to 1 000 000 g/mol, which can be prepared by known processes, Ullmann (5th) A10, page 615 et seq., Houben-Weyl E20/2, page 722 et seq., Ullmann (4th) 19, page 195 et seq., Kirk-Othmer (3rd) 16, page 357 et seq.

However, copolymers of said olefins or with further α-olefins are also possible, such as, for example, polymers of ethylene with butene, hexene and/or octene, EVA (ethylene-vinyl acetate copolymers), EBA (ethylene-ethyl acrylate copolymers), EEA (ethylene-butyl acrylate copolymers), EAS (acrylic acid-ethylene copolymers), EVK (ethylene-vinylcarbazole copolymers), EPB (ethylene-propylene block copolymers), EPDM (ethylene-propylene-diene copolymers), PB (polybutylenes), PMP (poly-methylpentenes), PIB (polyisobutylenes), NBR (acrylonitrile-butadiene copolymers), polyisoprenes, methyl-butylene copolymers, isoprene-isobutylene copolymers.

Preparation processes: such polymers are disclosed, for example, in

Kunststoff-Handbuch [Polymer Handbook], Volume IV, Munich, Hanser Verlag,
Ullman (4th) 19, page 167 et seq.,
Winnacker-Küchler (4th) 6, 353 to 367,
Elias & Vohwinkel, Neue Polymere Werkstoffe [Novel Polymeric Materials], Munich, Hanser 1983,
Franck & Biederbick, Kunststoff Kompendium [Polymer Compendium] Würzburg, Vogel 1984.

Thermoplastic polymers suitable according to the invention are also thermoplastic aromatic polycarbonates, in particular those based on diphenols of the formula (I)

in which
A is a single bond, $C_1$-$C_5$-alkylene, $C_2$-$C_5$-alkylidene, $C_5$-$C_6$-cycloalkylidene, —S—, —SO$_2$—, —O—, —CO— or a $C_6$-$C_{12}$-arylene radical which may optionally be condensed with further aromatic rings containing heteroatoms,
the radicals B, independently of one another, are in each case a $C_1$-$C_8$-alkyl, $C_6$-$C_{10}$-aryl, particularly preferably phenyl, $C_7$-$C_{12}$-aralkyl, preferably benzyl, halogen, preferably chlorine, bromine,
x independently of one another is in each case 0, 1 or 2 and
p is 1 or 0,
or alkyl-substituted dihydroxyphenylcycloalkanes of the formula (II), in which
$R^1$ and $R^2$, independently of one another, are in each case hydrogen, halogen, preferably chlorine or bromine, $C_1$-$C_8$-alkyl, $C_5$-$C_6$-cycloalkyl, $C_6$-$C_{10}$-aryl, preferably phenyl, and $C_7$-$C_{12}$-aralkyl, preferably phenyl-$C_1$-$C_4$-alkyl, in particular benzyl,
m is an integer from 4 to 7, preferably 4 or 5,
$R^3$ and $R^4$ for each Z can be chosen individually and are, independently of one another, hydrogen or $C_1$-$C_6$-alkyl, preferably hydrogen, methyl or ethyl, and
Z is carbon, with the proviso that on at least one atom Z, $R^3$ and $R^4$ are alkyl at the same time.

Suitable diphenols of the formula (I) are, for example, hydroquinone, resorcinol, 4,4'-dihydroxydiphenyl, 2,2-bis-(4-hydroxyphenyl)-propane, 2,4-bis-(4-hydroxy-phenyl)-2-methylbutane, 1,1-bis-(4-hydroxyphenyl)-cyclohexane, 2,2-bis-(3-chloro-4-hydroxyphenyl)-propane, 2,2-bis-(3,5-dibromo-4-hydroxyphenyl)-propane.

Preferred diphenols of the formula (I) are 2,2-bis-(4-hydroxyphenyl)-propane, 2,2-bis-(3,5-dichloro-4-hydroxyphenyl)-propane and 1,1-bis-(4-hydroxyphenyl)-cyclohexane.

Preferred diphenols of the formula (II) are dihydroxy-diphenylcycloalkanes having 5 and 6 ring carbon atoms in the cycloaliphatic radical [(m=4 or 5 in formula (II)], such as, for example, the diphenols of the formulae and 1,1-bis-(4-hydroxyphenyl)-3,3,5-trimethylcyclohexyne (formula IIc) being particularly preferred.

The polycarbonates suitable according to the invention can be branched in a known manner, and more specifically, preferably by the incorporation of from 0.05 to 2.0 mol %, based on the sum of diphenols used, of tri- or more than trifunctional compounds, e.g. those with three or more than three phenolic groups, for example phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-(4,4-bis-(4-hydroxyphenyl)-cyclohexyl)-propane, 2,4-bis-(4-hydroxyphenyl)-isopropyl)-phenol, 2,6-bis-(2-hydroxy-5'-methyl-benzyl)-4-methylphenol, 2-(4-hydroxyphenyl)-2-(2,4-dihydroxyphenyl)-propane, hexa-(4-(4-hydroxyphenyl-isopropyl)-phenyl) ortho-terephthalate, tetra-(4-hydroxyphenyl)-methane, tetra-(4-(4-hydroxyphenyl-isopropyl)-phenoxy)-methane and 1,4-bis-((4'-,4"-dihydroxytriphenyl)-methyl)-benzene.

Some of the other trifunctional compounds are 2,4-dihydroxybenzoic acid, trimesic acid, trimellitic acid, cyanuric chloride and 3,3-bis-(3-methyl-4-hydroxyphenyl)-2-oxo-2,3-dihydroindole.

Preferred polycarbonates are, in addition to the bisphenol A homopolycarbonate, the copolycarbonates of bisphenol A containing up to 15 mol %, based on the mole total of diphenols, of 2,2-bis-(3,5-dibromo-4-hydroxyphenyl)-propane.

The aromatic polycarbonates used can partially be replaced by aromatic polyester carbonates.

Aromatic polycarbonates and/or aromatic polyester carbonates are known in the literature and can be prepared by processes known in the literature (for the preparation of aromatic polycarbonates see, for example, Schnell, "Chemistry and Physics of Polycarbonates", Interscience Publishers, 1964, and DE-AS (German Published Specification) 1 495 626, DE-OS (German Published Specification) 2 232 877, DE-OS (German Published Specification) 2 703 376, DE-OS (German Published Specification) 2 714 544, DE-OS (German Published Specification) 3 000 610, DE-OS (German Published Specification) 3 832 396; for the preparation of aromatic polyester carbonates e.g. DE-OS (German Published Specification) 3 077 934).

Aromatic polycarbonates and/or aromatic polyester carbonates can be prepared, for example, by reacting diphenols with carbonic acid halides, preferably phosgene and/or with aromatic dicarboxylic acid dihalides, preferably benzenedicarboxylic acid dihalides, by the phase interface method, optionally using chain terminators and optionally using trifunctional or more than trifunctional branching agents.

In addition, styrene copolymers of one or at least two ethylenically unsaturated monomers (vinyl monomers) are suitable as thermoplastic polymers, such as, for example, those of styrene, α-methylstyrene, ring-substituted styrenes, acrylonitrile, methacrylonitrile, methyl methacrylate, maleic anhydride, N-substituted maleimides and (meth)acrylates having 1 to 18 carbon atoms in the alcohol component.

The copolymers are resinous, thermoplastic and rubber-free.

Preferred styrene copolymers are those comprising at least one monomer from the series styrene, α-methylstyrene and/or ring-substituted styrene with at least one monomer from the series acrylonitrile, methacrylonitrile, methyl methacrylate, maleic anhydride and/or N-substituted maleimide.

Particularly preferred weight ratios in the thermoplastic copolymer are 60 to 95% by weight of the styrene monomers and 40 to 5% by weight of the further vinyl monomers.

Particularly preferred copolymers are those of styrene with acrylonitrile and optionally with methyl methacrylate, of α-methylstyrene with acrylonitrile and optionally with methyl methacrylate, or of styrene and α-methylstyrene with acrylonitrile and optionally with methyl methacrylate.

The styrene-acrylonitrile copolymers are known and can be prepared by free-radical polymerization, in particular by emulsion, suspension, solution or bulk polymerization. The copolymers preferably have molecular weights $\overline{M}_w$ (weight-average, determined by light scattering or sedimentation) between 15 000 and 200 000 g/mol.

Particularly preferred copolymers are also random copolymers of styrene and maleic anhydride, which can preferably be prepared from the corresponding monomers by continuous bulk or solution polymerization with incomplete conversions.

The proportions of the two components of the random styrene-maleic anhydride copolymers suitable according to the invention can be varied within wide limits. The preferred content of maleic anhydride is 5 to 25% by weight.

Instead of styrene, the polymers can also contain ring-substituted styrenes, such as p-methylstyrene, 2,4-dimethylstyrene and other substituted styrenes, such as α-methylstyrene.

The molecular weights (number-average $\overline{M}_n$) of the styrene-maleic anhydride copolymers can vary over a wide range. Preference is given to the range from 60 000 to 200 000 g/mol. For these products, a limiting viscosity of from 0.3 to 0.9 is preferred (measured in dimethylformamide at 25° C.; see Hoffmann, Kromer, Kuhn, Polymeranalytik I, Stuttgart 1977, page 316 et seq.).

Also suitable as thermoplastic polymers are graft copolymers. These include graft copolymers having rubber-elastic properties which are essentially obtainable from at least 2 of the following monomers: chloroprene, 1,3-butadiene, isopropene, styrene, acrylonitrile, ethylene, propylene, vinyl acetate and (meth)acrylates having 1 to 18 carbon atoms in the alcohol component; i.e. polymers as described, for example, in "Methoden der Organischen Chemie" [Methods in Organic Chemistry] (Houben-Weyl), vol. 14/1, Georg Thieme Verlag, Stuttgart 1961, p. 393-406 and in C. B. Bucknall, "Toughened Plastics", Appl. Science Publishers, London 1977. Preferred graft polymers are partially crosslinked and have gel contents of more than 20% by weight, preferably more than 40% by weight, in particular more than 60% by weight.

Preferred graft copolymers are, for example, copolymers of styrene and/or acrylonitrile and/or alkyl (meth)acrylates grafted onto polybutadienes, butadiene/styrene copolymers and acrylate rubbers; i.e. copolymers of the type described in DE-OS (German Published Specification) 1 694 173 (=U.S. Pat. No. 3,564,077); polybutadienes, grafted with alkyl acrylates or methacrylates, vinyl acetate, acrylonitrile, styrene and/or alkylstyrenes, butadiene-styrene or butadiene-acrylonitrile copolymers, polyisobutenes or polyisoprenes, as described, for example, in DE-OS (German Published Specification) 2 348 377 (=U.S. Pat. No. 3,919, 353).

Particularly preferred polymers are, for example, ABS polymers, as are described, for example, in DE-OS (German Published Specification) 2 035 390 (=U.S. Pat. No. 3,644, 574) or in DE-OS (German Published Specification) 2 248 242 (=GB Patent Specification 1 409 275).

The graft copolymers can be prepared by known processes such as bulk, suspension, emulsion or bulk-suspension processes.

Thermoplastic polyamides which may be used are polyamide 66 (polyhexamethylene adipamide) or polyamides of cyclic lactams having 6 to 12 carbon atoms, preferably of laurolactam and particularly preferably ε-caprolactam=polyamide 6 (polycapro-lactam) or copolyamides with main constituents 6 or 66 or mixtures whose main constituent is said polyamides. Preference is given to polyamide 6 prepared by activated anionic polymerization or to copolyamide whose main constituent is polycaprolactam and which is prepared by activated anionic polymerization.

Suitable ceramic materials are metal oxides, metal carbides, metal nitrides of the abovementioned metals, and composites of these materials.

The surface topography of any surface can in principle be described by a combination of Fourier components of the spatial frequencies $f_x$ and $f_y$ and the amplitudes $a(f_x)$ and $a(f_y)$ associated with the frequencies. $\lambda_x = f_x^{-1}$ and $\lambda_y = f_y^{-1}$ are the structure lengths of coordinates x and y.

In the technology the use of the so-called power spectral density $S_2(f_x, f_y)$ is customary. The averaged power spectral density is proportional to the average of all quadratic amplitudes at the respective spatial frequencies $f_x$ and $f_y$. If the surface is isotropic, the surface topography can be characterized by a power spectral density PSD(f) averaged over the polar angle. The power spectral density PSD(f) is still a two-dimensional function of the dimension [length]$^4$, although both directions are identical and only one is taken into consideration. This calculation is described, for example, in the publication by C. Ruppe and A. Duparré, Thin Solid Films, 288, (1996), page 9 in equation (2).

Depending on which measurement method is used to determine the topography, the power spectral density results directly, or has to be converted to the power spectral density PSD(f) by means of a Fourier transformation of height profile data of the topography. This conversion is described, for example, in the publication by C. Ruppe and A. Duparré, Thin Solid Films, 288, (1996), page 9, which is hereby introduced as reference and thus forms part of the disclosure.

The surface topography of an ultraphobic surface under a drop of liquid has raised areas and depressions, the height or depth of which vary between 0.1 nm and 1 mm. Because of this enormous bandwidth it is currently still not possible to determine the surface topography using a single measurement method, meaning that 3 measurement and evaluation methods have to be combined with one another in order to be able to precisely determine the surface topography. These measurement methods are:

1. white light interferometry (WLI)

2. scanning atomic force microscopy (AFM)

3. scanning tunnelling microscopy (STM).

Using these measurement methods, the PSD(f) is determined in each case section by section in relatively narrow overlapping spatial frequency ranges Δf. This power spectral density determined section by section is then combined to give the overall PSD(f) in the spatial frequency range from $f=10^{-3}$ μm$^{-1}$ to $f=10^3$ μm$^{-1}$. The technique of combining PSD curves determined section by section is shown, for example, in C. Ruppe and A. Duparré, Thin Solid Films, 288, (1996), page 10, which is hereby introduced as reference and thus forms part of the disclosure.

White light interferometry (WLI) is used to determine the power spectral density in the spatial frequency range from $\Delta f=1\times10^{-3}$ μm$^{-1}$–1 μm$^{-1}$, where:

with the measurement field: 1120 μm×1120 μm, a spatial frequency range from:

$\Delta f=9\times10^{-4}$ μm$^{-1}$ to $2\times10^{-1}$ μm$^{-1}$ is measured, with the measurement field: 280 μm×280 μm, a spatial frequency range from:

$\Delta f=4\times10^{-3}$ μm$^{-1}$ to $9\times10^{-1}$ μm$^1$ is measured, with the measurement field: 140 μm×140 μm, a spatial frequency range from:

$\Delta f=7\times10^{-3}$ μm$^{-1}$ to $2\times10^0$ μm$^{-1}$ is measured.

In this measurement method, a height profile z(x,y) is determined using a white light interferometer, where z is the height over any desired reference height $z_0$ at the respective site x or y. The exact experimental design and the measurement method can be found in R. J. Recknagel, G. Notni, Optics Commun. 148, 122-128 (1998). The height profile z(x,y) is converted analogously to the procedure in the case of scanning atomic force microscopy or scanning tunnelling microscopy described below.

Scanning atomic force microscopy (AFM) is used to determine the power spectral density in the spatial frequency range $\Delta f=1\times10^{-2}$ μm$^{-1}$ $1\times10^2$ μm$^{-1}$ and is a measurement method generally known to the person skilled in the art in which a height profile $z_{m,n}$ of the surface is recorded in the contact or tapping mode using a scanning atomic force microscope. For this measurement method, different scan areas L×L are used. These scan areas and the number of datapoints N are used to calculate the minimum or maximum spatial frequency which can be investigated per scan area, where the following applies: $f_{max}=N/2L$ or $f_{min}=1/L$. Preferably, 512 measurement points are used per scan area, so that in the scan area 50 µm×50 µm, a spatial frequency range of:

$\Delta f=2\times 10^{-2}$ µm$^{-1}$ to 5 µm$^{-1}$ is measured, in the scan area 10 µm×10 µm, a spatial frequency range of:

$\Delta f=1\times 10^{-1}$ µm$^{-1}$ to $3\times 10^{1}$ µm$^{-1}$ is measured, and in the scan area 1 µm×1 µm a spatial frequency range of:

$\Delta f=1$ µm$^{-1}$ to $3\times 10^{2}$ µm$^{-1}$ is measured.

The height profile $z_{m,n}$ is based on an arbitrary reference height $z_0$. m, n are measurement points in the x or y direction recorded at equidistant spacing $\Delta L$. The height profile data are converted into the averaged power spectral density PSD in accordance with equations 1 and 2 of the publication by C. Ruppe and A. Duparré, Thin Solid Films, 288, (1996), page 9.

Scanning tunnelling microscopy (STM) is used to determine the power spectral density in the spatial frequency range $\Delta f=1\times 10^{1}$ µm$^{-1}$–$1\times 10^{3}$ µm$^{-1}$ and is a measurement method generally known to the person skilled in the art in which a height profile $z_{m,n}$ of the surface is recorded using a scanning tunnelling microscope. In this measurement method too, different scan areas L×L are used. These scan areas and the number of datapoints N are used to calculate the minimum or maximum spatial frequency which can be investigated per scan area, where the following applies:

$f_{max}=N/2L$ or $f_{min}=1/L$. Preferably, 512 measurement points are used per scan area, so that in the scan area 0.5 µm×0.5 µm, a spatial frequency range of:

$\Delta f=2$ µm$^{-1}$ to $5\times 10^{2}$ µm$^{-1}$ is measured, scan area 0.2 µm×0.2 µm, a spatial frequency range of:

$\Delta f=5$ µm$^{-1}$ to $1\times 10^{3}$ µm$^{-1}$ is measured, scan area 0.1 µm×0.1 µm a spatial frequency range of:

$\Delta f=1\times 10^{-1}$ µm$^{-1}$ to $3\times 10^{3}$ µm$^{-1}$ is measured.

The height profile $z_{m,n}$ is based on an arbitrary reference height $z_0$. m, n are measurement points in the x or y direction recorded at equidistant spacing $\Delta L$. The height profile data are converted to the averaged power spectral density PSD according to equations 1 and 2 of the publication by C. Ruppe and A. Duparré, Thin Solid Films, 288, (1996), page 9.

The exact experimental design and carrying out of AFM and STM measurements is described, for example in the publication by S. N. Magonov, M.-H. Whangbo, Surface Analysis with STM and AFM, VCH, Weinheim 1996, in particular on pages 47-62.

The PSD curves obtained by the various measurement methods or with the various scan areas are combined to give a PSD(f) curve in the spatial frequency range from $10^{-3}$ µm$^{-1}$ to $10^{3}$ µm$^{-1}$. The PSD(f) curve is constructed in accordance with a procedure as described in C. Ruppe and A. Duparré, Thin Solid Films, 288, (1996), page 10-11.

FIGS. 1-4 show the result for PSD(f) curves in log-log representation, plotted as log (PSD(f)/nm$^4$) as a function of log (f/µm$^{-1}$).

Power spectral densities of this type have also been known for some time for many other surfaces and can be used for very different purposes, cf. e.g. J. C. Stover, Optical Scattering, 2nd Edition, SPIE Press, Bellingham, Wash., USA 1995, Chapter 2, page 29 et seq. and Chapter 4, page 85 et seq.

In order to achieve a better illustration of the topography of the surfaces for the purposes pursued here, a spatial-frequency-dependent amplitude a(f) of the sinusoidal Fourier components is calculated from the power spectral densities PSD(f). For this, the formulae (4.19) on page 103 and Table 2.1 on page 34 and Table 2.2 on page 37 from J. C. Stover, Optical Scattering, 2nd Edition, SPIE Press, Bellingham, Wash., USA 1995 are used.

The amplitudes a(f) of the sinusoidal Fourier components normalized with the associated structural lengths $\lambda=f^{-1}$ are plotted in FIGS. 5-8 against the logarithmic spatial frequency log (f/µm$^{-1}$) in the function S as $$S(\log f)=a(f)\cdot f \quad (1).$$

The invention is based on the surprising finding that a surface which is provided with a structure for which the integral of the function $S(\log f)=a(f)\,f$ calculated between the integration limits $f_1/\text{µm}^{-1}=-3$ and $f_2/\text{µm}^{-1}=3$, is greater than 0.5 and which consists of a hydrophobic material or is coated with hydrophobic material has ultraphobic properties, such that a drop of water on this surface generally has a contact angle of >150°.

This entirely surprising new finding permits the prediction of many details regarding possible process steps in the preparation of ultraphobic surfaces. The core statement of the finding is as follows: FIGS. 5-8 show the structural amplitudes a(f)·f normalized with the wavelengths $\lambda=f^{-1}$ for various frequencies f on the logarithmic frequency scale log(f). A value for a(f)·f=0.5 means, for example, that the normalized amplitude, i.e. the "roughness" of this Fourier component is 0.5-fold its wavelength $\lambda=f^{-1}$. The integral of equation (1) thus states that the average of all normalized amplitudes a(f)·f for the individual different frequencies must exceed a value of 0.5, i.e. the roughness averaged over all frequencies must be maximized in order to obtain an ultraphobic surface.

different spatial frequencies are included in this sum with equal weighting (by virtue of the log(f) representation). It is therefore unimportant in which frequency range the individual roughnesses lie.

On the basis of this finding, the person skilled in the art knows that, for example, the roughening of a surface using conical particles of uniform size is unfavourable. What is favourable, however, is the additional roughening of the particle surfaces using smaller structures, e.g. using small particles which rest on or adhere to the large particles, but which are not present separately alongside the large particles.

In addition, it is clear that, for example during the roughening of a surface by introducing scratches (e.g. by means of abrasive particles), it is to be ensured that the depressions of a scratch must for their part be again as rough as possible within the next dimensional order of magnitude. If this is not the case, the primary depressions are for their part to be roughened again in a further operation.

In this connection, it may be noted that the new finding described here makes no limitation with regard to the shape or the profile of the depressions or rough structures. In the case of the example of rough particles which are applied to a surface and which form the necessary structure for an ultraphobic surface, it is possible for the finer substructures on the particles themselves to have a completely different shape (i.e. another spatial frequency spectrum) from the structure which the particles themselves form on the surface.

Moreover, the determination of frequency-dependent amplitudes of the Fourier components with the help of the power spectral density in the abovementioned form opens up an unknown possibility of testing different materials with completely different surface structures with regard to their ultraphobic property and of achieving a characterization.

The invention further provides a method of testing surfaces for ultraphobic properties, characterized in that the surface is coated with a thin layer of noble metal or GaAs as adhesion promoter, in particular with gold, in particular in a layer thickness of from 10 to 100 nm, by atomization, is coated with a phobicization auxiliary, preferably with decanethiol, then the surface topography is analysed, in particular using a combination of scanning tunnelling microscopy, scanning atomic force microscopy and white light interferometry and, from the measured data, the spatial frequencies f of the individual Fourier components and their amplitudes a(f) expressed by the integral of the function S $$S(\log f) = a(f) \cdot f \quad (1),$$

calculated between the integration limits $\log(f_1/\mu m^{-1}) = -3$ and $\log(f_2/\mu m^{-1}) = 3$ is formed and, optionally in addition the contact angle of water on the surface thus treated is measured.

By virtue of the coating with an adhesion promoter (typically gold from 10 to 100 nm) and the choice of a consistent phobicization agent, it is possible to investigate many different materials whose surface is in principle suitable for developing ultraphobic surface properties, irrespective of the material. Thus, different surface structures are comparable with one another.

Preference is given to an ultraphobic surface characterized in that the surface has a coating with a hydrophobic phobicization auxiliary, in particular an anionic, cationic, amphoteric or nonionic, interface-active compound.

Interface-active compounds of any molar mass are to be regarded as phobicization auxiliaries. These compounds are preferably cationic, anionic, amphoteric or nonionic interface-active compounds, as listed, for example, in the directory "Surfactants Europa, A Dictionary of Surface Active Agents available in Europe, edited by Gordon L. Hollis, Royal Society of Chemistry, Cambridge, 1995.

Examples of anionic phobicization auxiliaries are: alkylsulphates, ether sulphates, ether carboxylates, phosphate esters, sulphosuccinates, sulphosuccinate amides, paraffinsulphonates, olefinsulphonates, sarcosinates, isothionates, taurates and lignnin-based compounds.

Examples of cationic phobicization auxiliaries are quaternary alkylammonium compounds and imidazoles Examples of amphoteric phobicization auxiliaries are betaines, glycinates, propionates and imidazoles.

Examples of nonionic phobicization auxiliaries are: alkoxylates, alkyloamides, esters, amine oxides, alkyl polyglycosides, alkyl sulphides and alkyl disulphides. Also suitable are: reaction products of alkylene oxides with alkylatable compounds, such as, for example, fatty alcohols, fatty amines, fatty acids, phenols, alkylphenols, arylalkylphenols, such as styrene-phenol condensates, carboxamides and resin acids.

Particular preference is given to phobicization auxiliaries in which 1 to 100%, particularly preferably 60 to 95%, of the hydrogen atoms have been substituted by fluorine atoms. Examples which may be mentioned are perfluorinated alkylsulphates, perfluorinated alkylsulphonates, perfluorinated alkyl sulphides, perfluorinated alkyl disulphides, perfluorinated alkylphosphonates, perfluorinated alkylphosphinates and perfluorinated carboxylic acids.

As polymeric phobicization auxiliaries for the hydrophobic coating or as polymeric hydrophobic material for the surface, preference is given to using compounds with a molar mass $M_w$ of >500 to 1 000 000, preferably 1000 to 500 000 and particularly preferably 1500 to 20 000. The polymeric phobicization auxiliaries can be nonionic, anionic, cationic or amphoteric compounds. In addition, these polymeric phobicization auxiliaries can be homo- and copolymers, graft polymers and graft copolymers, and random block polymers.

Particularly preferred polymeric phobicization auxiliaries are those of the type AB, BAB and ABC block polymers. In the AB or BAB block polymers, the A segment is a hydrophilic homopolymer or copolymer, and the B block is a hydrophobic homopolymer or copolymer or a salt thereof.

Particular preference is also given to anionic polymeric phobicization auxiliaries, in particular condensation products of aromatic sulphonic acids with formaldehyde and alkylnaphthalenesulphonic acids or of formaldehyde, naphthalenesulphonic acids and/or benzenesulphonic acids, condensation products of optionally substituted phenol with formaldehyde and sodium bisulphite.

Also preferred are condensation products which are obtainable by reaction of naphthols with alkanols, additions of alkylene oxide and at least partial conversion of the terminal hydroxyl groups into sulpho groups or monoesters of maleic acid and phthalic acid or succinic acid.

In another preferred embodiment, the phobicization auxiliary is [lacuna] from the group of sulphosuccinates and alkylbenzenesulphonates. Also preferred are sulphated, alkoxylated fatty acids or salts thereof. Alkoxylated fatty acid alcohols means, in particular, those $C_6$-$C_{22}$-fatty acid alcohols which are saturated or unsaturated and have 5 to 120, 6 to 60, very particular preferably 7 to 30, ethylene oxide units, in particular stearyl alcohol. The sulphated alkokylated fatty acid alcohols are preferably in the form of a salt, in particular an alkali metal or amine salt, preferably diethylamine salt.

The invention further provides a process for the preparation of an ultraphobic surface that is characterized in that a mould, which has the negative of a surface topography suitable for an ultraphobic surface, is moulded with a mixture of a plastic and a hydrophobic or, in particular, oleophobic additive, which separates out upon curing as a thin film between the surface of the mould and the plastic moulding.

In another preferred embodiment, the mould is filled with a polymer and the polymer moulding is then provided with a hydrophobic or, in particular, oleophobic coating.

Within the meaning of the invention, a mould is any desired mould which can be filled with polymers or polymer mixtures. This mould has a surface whose surface topography is the negative to any desired ultraphobic surface.

However, the surface topography of an ultraphobic surface preferably corresponds to that of a pickled, anodized and sealed (i.e. treated with hot water or water vapour) aluminium surface, obtainable by the processes disclosed in the German patent application with the file reference 19860138.7, where the surfaces do not have to have a hydrophobic coating. Here, the surface of an aluminium carrier, treated in particular by an acidic electrochemical pickling, an anodic oxidation, and in hot water or water vapour at a temperature of from 50 to 100° C., is optionally coated with an adhesion promoter layer.

Depending on the material used, the surface can be moulded by pouring out or injecting in with liquefied or dissolved thermoplastic polymer or with as yet uncured polymer. Appropriate techniques are known and familiar to the person skilled in the art of polymer technology.

The invention further provides a process for the preparation of a surface having ultraphobic properties, which is characterized in that the surface is moulded from a positive mould which has a surface structure suitable for an ultraphobic surface, with a mixture of a plastic and a hydrophobic or, in particular, oleophobic additive, which separates out upon curing as a thin film between the surface of the mould and the plastic moulding.

In another preferred embodiment, the mould is filled with a polymer and the polymer moulding is then provided with a hydrophobic or, in particular, oleophobic coating.

Within the meaning of the invention, a mould is any desired mould which can be filled with polymers or polymer mixtures. This mould has a surface whose surface topography is the negative to any desired surface which provides [lacuna] structural prerequisite for an ultraphobic surface.

However, the surface topography of an ultraphobic surface preferably corresponds to that of a pickled, anodized and sealed (i.e. treated with hot water or water vapour) aluminium surface, obtainable by the processes disclosed in the German patent application with the file reference 19860138.7, where the surfaces do not have to have a hydrophobic coating. Here, the surface of an aluminium carrier, treated in particular by an acidic electrochemical pickling, anodic oxidation, and in hot water or water vapour at a temperature of from 50 to 100° C., is optionally coated with an adhesion promoter layer.

Depending on the material used, the surface can be moulded by pouring out or injecting in with liquefied or dissolved thermoplastic polymer or with as yet uncured polymer. Appropriate techniques are known and familiar to the person skilled in the art of polymer technology.

The process according to the invention is based on the surprising finding that a surface whose topography has the prerequisites for an ultraphobic surface can be moulded directly and, from the resulting negative, an ultraphobic surface again results. This procedure renders superfluous the laborious procuration of a negative of the topography of an ultraphobic surface as taught by the prior art.

Using the process according to the invention it is possible to prepare ultraphobic surfaces in which the contact angle of a drop on the surface is $\geq 155°$. The invention therefore also provides the ultraphobic surfaces obtained by the process according to the invention.

Polymers suitable for carrying out both moulding processes are thermosetting or thermoplastic polymers.

The thermosetting polymer is, in particular, chosen from the series: diallyl phthalate resin, epoxy resin, urea-formaldehyde resin, melamine-formaldehyde resin, melamine-phenol-formaldehyde resin, phenol-formaldehyde resin, polyimide, silicone rubber and unsaturated polyester resin.

The thermoplastic polymer is chosen in particular from the series: thermoplastic polyolefin, e.g. polypropylene or polyethylene, polycarbonate, polyester carbonate, polyester (e.g. PBT or PET), polystyrene, styrene copolymer, SAN resin, rubber-containing styrene graft copolymer, e.g. ABS polymer, polyamide, polyurethane, polyphenylene sulphide, polyvinyl chloride or any possible mixtures of said polymers.

According to the invention, the mould is filled with a mixture which consists of a polymer such as PC or PMMA and a hydrophobic and/or oleophobic additive which, upon curing, deposits as a thin film between the surface of the mould of the negative and the polymer moulding formed.

Interface-active compounds with any desired molar mass are to be regarded as additive. These compounds are preferably cationic, anionic, amphoteric or nonionic interface-active compounds, as listed, for example, in the directory "Surfactants Europa, A Dictionary of Surface Active Agents available in Europe, edited by Gordon L. Hollis, Royal Socity of Chemistry, Cambridge, 1995.

Examples of anionic additives are: alkylsulphates, ether sulphates, ether carboxylates, phosphate esters, sulphosuccinates, sulphosuccinate amides, paraffinsulphonates, olefinsulphonates, sarcosinates, isothionates, taurates and lingnin-based compounds.

Examples of cationic additives are quaternary alkylammonium compounds and imidazoles Examples of amphoteric additives are betaines, glycinates, propionates and imidazoles.

Examples of nonionic additives are: alkoxylates, alkyloamides, esters, amine oxides, alky polyglycosides, alkyl sulphides and alkyl disulphides. Also suitable are: reaction products of alkylene oxides with alkylatable compounds, such as, for example, fatty alcohols, fatty amines, fatty acids, phenols, alkylphenols, arylalkylphenols, such as styrene-phenol condensates, carboxamides and resin acids.

Particular preference is given to additives in which 1 to 100%, particularly preferably 60 to 95%, of the hydrogen atoms have been substituted by fluorine atoms. Examples which may be mentioned are perfluorinated alkylsulphate, perfluorinated alkylsulphonates, perfluorinated alkyl sulphides, perfluorinated alkyl disulphides, perfluorinated alkylphosphonates, perfluorinated alkylphosphinates and perfluorinated carboxylic acids.

As polymeric additives for the hydrophobic coating or as polymeric hydrophobic material for the surface, preference is given to using compounds with a molar mass $M_w$ of >500 to 1 000 000, preferably 1000 to 500 000 and particularly preferably 1500 to 20 000. These polymeric additives can be nonionic, anionic, cationic or amphoteric compounds. In addition, these polymeric additives can be homo- and copolymers, graft polymers and graft copolymers, and random block polymers.

Particularly preferred polymeric additives are those of the type AB, BAB and ABC block polymers. In the AB or BAB block polymers, the A segment is a hydrophilic homopolymer or copolymer, and the B block is a hydrophobic homopolymer or copolymer or a salt thereof.

Particular preference is also given to anionic, polymeric additives, in particular condensation products of aromatic sulphonic acids with formaldehyde and alkyl-naphthalenesulphonic acids or of formaldehyde, naphthalenesulphonic acids and/or benzenesulphonic acids, condensation products of optionally substituted phenol with formaldehyde and sodium bisulphite.

Also preferred are condensation products obtainable by reaction of naphthols with alkanols, additions of alkylene oxide and at least partial conversion of the terminal hydroxyl groups into sulpho groups or monoesters of maleic acid and phthalic acid or succinic acid.

In another preferred embodiment, the additive is [lacuna] from the group of sulpho-succinates and alkylbenzenesulphonates. Also preferred are sulphated, alkoxylated fatty acids or salts thereof. Alkoxylated fatty acid alcohols means, in particular, those $C_6$-$C_{22}$-fatty acid alcohols which are saturated or unsaturated and have 5 to 120, 6 to 60, very particularly preferably 7 to 30, ethylene oxide units, in particular stearyl alcohol. The sulphated alkokylated fatty acid alcohols are preferably in the form of a salt, in particular an alkali metal or amine salt, preferably a diethylamine salt.

This procedure means that the moulding no longer has to be provided with a hydrophobic and or oleophobic coating, meaning that one process step is possibly saved.

The ultraphobic surfaces according to the invention have the advantage, inter alia, that they are self-cleaning, self-cleaning taking place when the surface is exposed from time to time to rain or moving water. As a result of the ultraphobic property of the surface, the drops of water roll off the surface, and dirt particles, which adhere only very poorly to the surface, settle on the surface of the drops which are rolling off and are thus removed from the ultraphobic surface. This self-cleaning functions not only with water but also with oil.

The invention also provides a material or construction material which has an ultraphobic surface according to the invention.

There are a large number of industrial use possibilities for the surface according to the invention. The invention therefore also provides for the following uses of the ultraphobic surfaces according to the invention:

Using the ultraphobic surface, hulls of ships can be coated in order to reduce their resistance to friction.

A further use of the ultraphobic surface is the treatment of surfaces to which water must not adhere in order to avoid icing over. Examples which may be mentioned here are the surfaces of heat exchangers, e.g. in refrigerators, or the surfaces of aircraft.

The surfaces according to the invention are also suitable for fixing to house facades, roofs, monuments in order to render these self-cleaning.

The invention also provides for the use of the ultraphobic surface according to the invention for the friction-reducing lining of vehicle bodies, aircraft fuselages or hulls of ships.

The invention further provides for the use of the ultraphobic surface as self-cleaning coating or panelling of building structures, roofs, windows, ceramic construction material, e.g. for sanitary installations, household appliances.

The invention further provides for the use of the ultraphobic surface as an antirust coating of metal objects. The invention also provides for the use of the ultraphobic surface according to the invention as a transparent sheet in the case of transparent substrate material or as a topcoat of transparent sheets, in particular glass or plastic sheets, in particular for solar cells, vehicles or greenhouses.

The invention also provides the use of the ultraphobic surface as a coating for vessels in which liquids are handled, e.g. in order to meter them or in order to channel them therein. These vessels can, for example, be cannulae, hoses or storage vessels.

The invention further provides a process for the preparation of a surface having ultraphobic properties based on an $AlMg_3$ alloy, characterized in that the surface is cleaned, etched, anodically oxidized, passivated in boiling water, optionally coated with a noble metal as adhesion promoter, in particular with gold with a layer thickness of from 10 to 100 nm, in particular coated by atomization, and coated with a hydrophobic material, in particular with an anionic, cationic, amphoteric or nonionic, interface-active compound as phobicization auxiliary.

Instead of using the integral of the function S $$S(\log f) = a(f) \cdot f \qquad (1)$$

within the limits $\log(f_1/\mu m^{-1}) = -3$ and $\log(f_2/\mu m^{-1}) = 3$ with a value greater than 0.5 for the description of the ultraphobic surface, it is also possible to use the integral of the function F $$F(\log f) = 3 + \log(a(f) \cdot f) \qquad (2),$$

in the interval $\log(f_1/\mu m^{-1}) = -3$ to $\log(f_2/\mu m^{-1}) = 3$. In the range of positive values for F, the value of this integral must be greater than 5 in order to produce a surface having ultraphobic properties. The description using the function F has already been used in the German patent application with the file reference 19860136.0. However, the description (1) using the function S has the advantage that the value of the integral of S(log f) is very clear. This is because it is proportional to the normalized amplitude of all Fourier components $<a(f) \cdot f>$ averaged on a logarithmic frequency scale in the interval $-3 \leq \log(f/\mu m^{-1}) \leq 3$. Thus, the condition found for the preparation of ultraphobic surfaces is, in brief: the normalized average of all Fourier amplitudes $<a(f) \cdot f>$ determined on a logarithmic frequency scale must be greater than 0.5/6=0.08. For an "average" frequency, the Fourier amplitude should thus be at least about 8% of the structural length.

Figure 1:
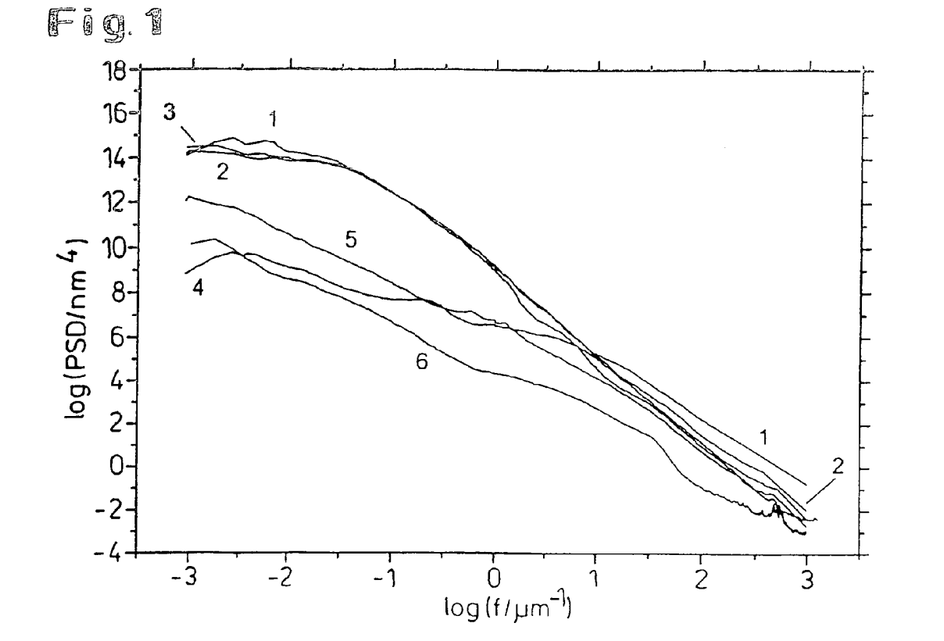
FIG. 1 representation of the PSD(f) curves of ultraphobic surfaces according to the invention of Examples 1-6
Figure 2:
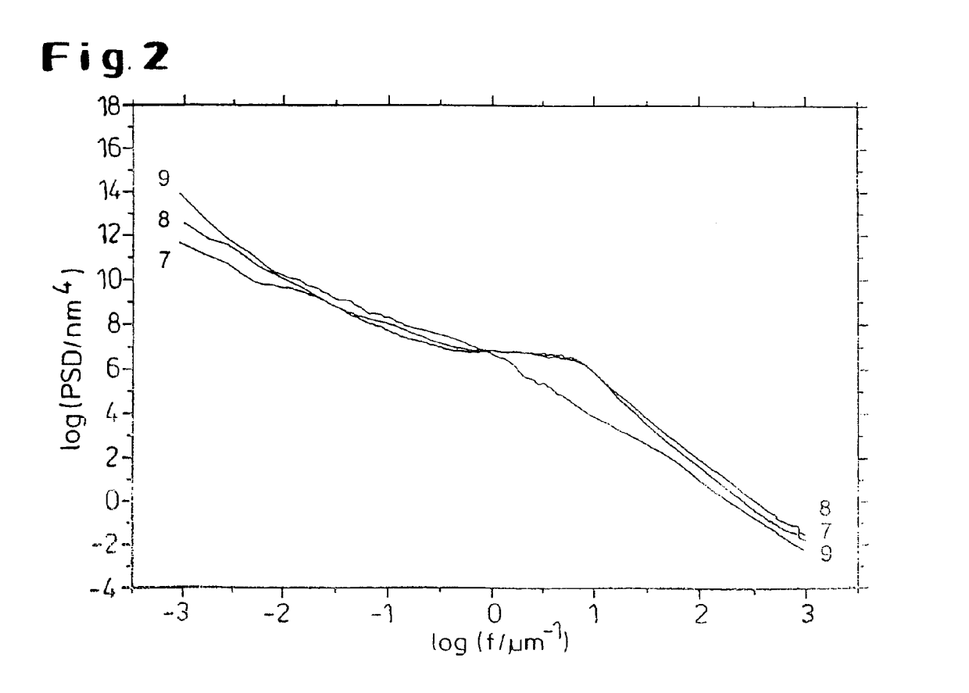
FIG. 2 representation of the PSD(f) curves of ultraphobic surfaces according to the invention of Examples 7-9
Figure 3:
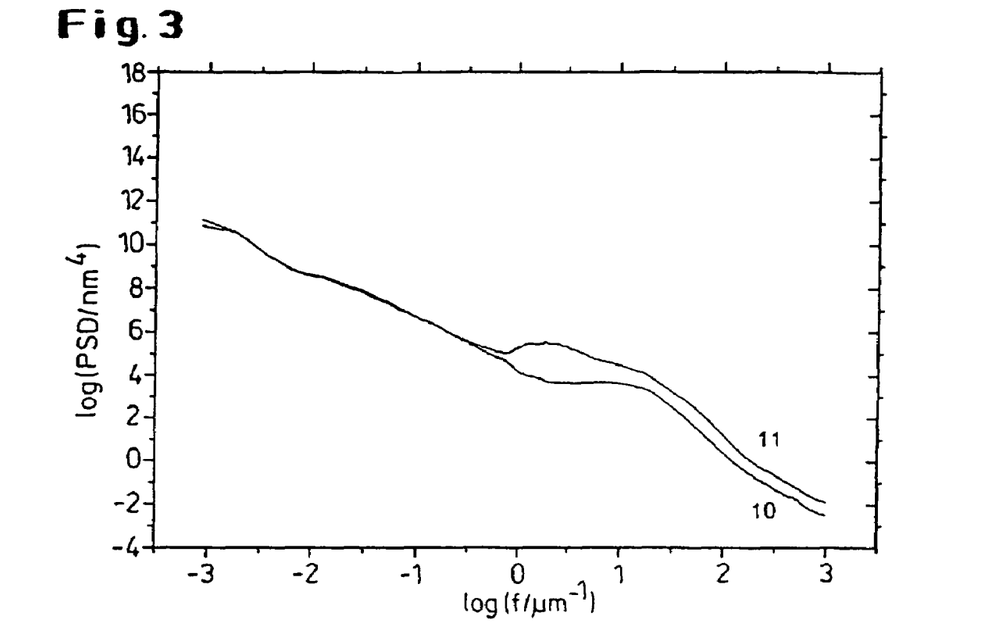
FIG. 3 representation of the PSD(f) curves of ultraphobic surfaces according to the invention of Examples 10-11
Figure 4:
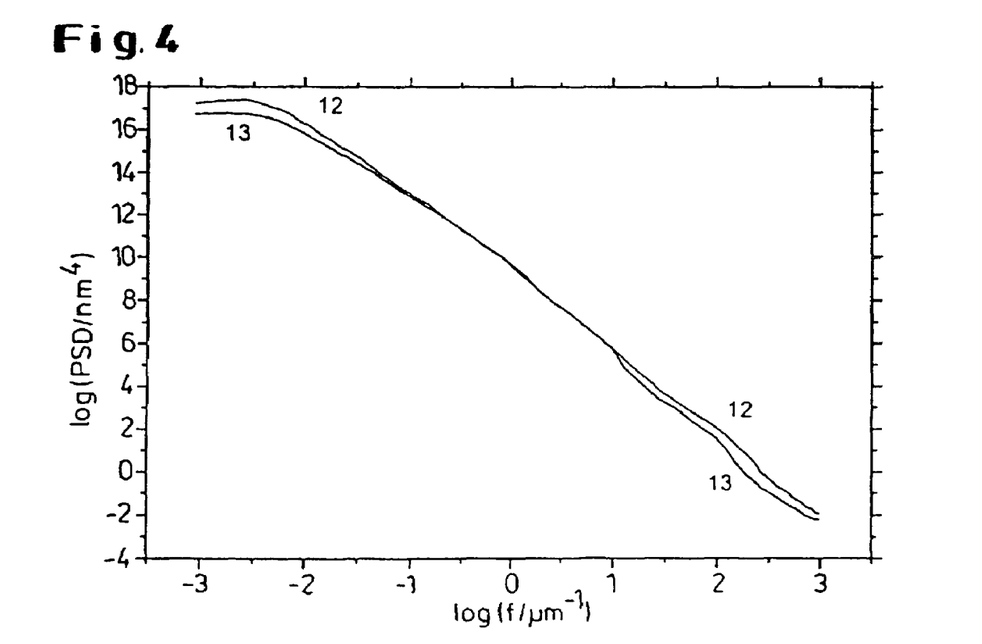
FIG. 4 representation of the PSD(f) curves of ultraphobic surfaces according to the invention of Examples 12-13
Figure 5:
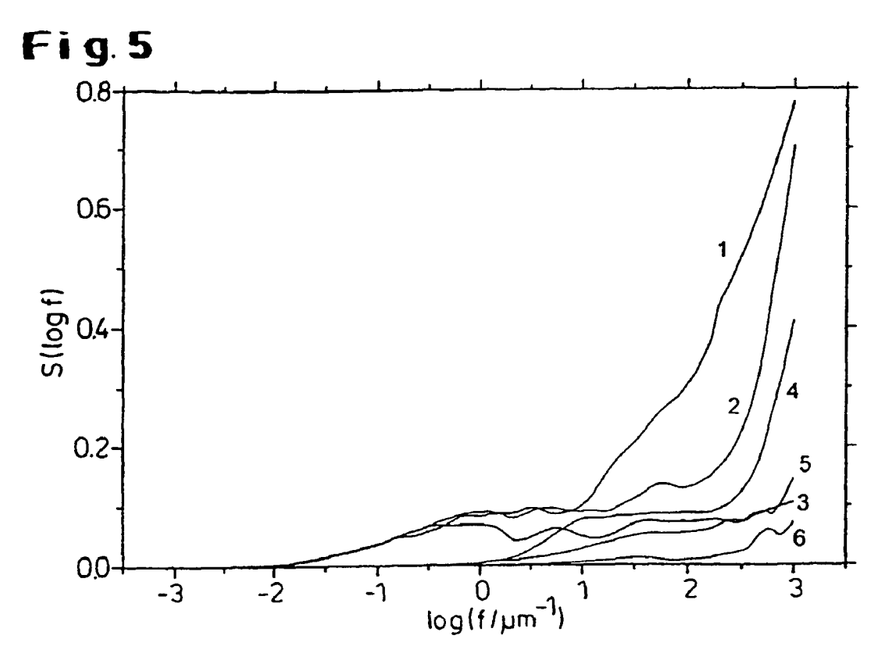
FIG. 5 representation of the frequency-dependent amplitudes a(f) of the Fourier components of surfaces according to the invention of Examples 1-6
Figure 6:
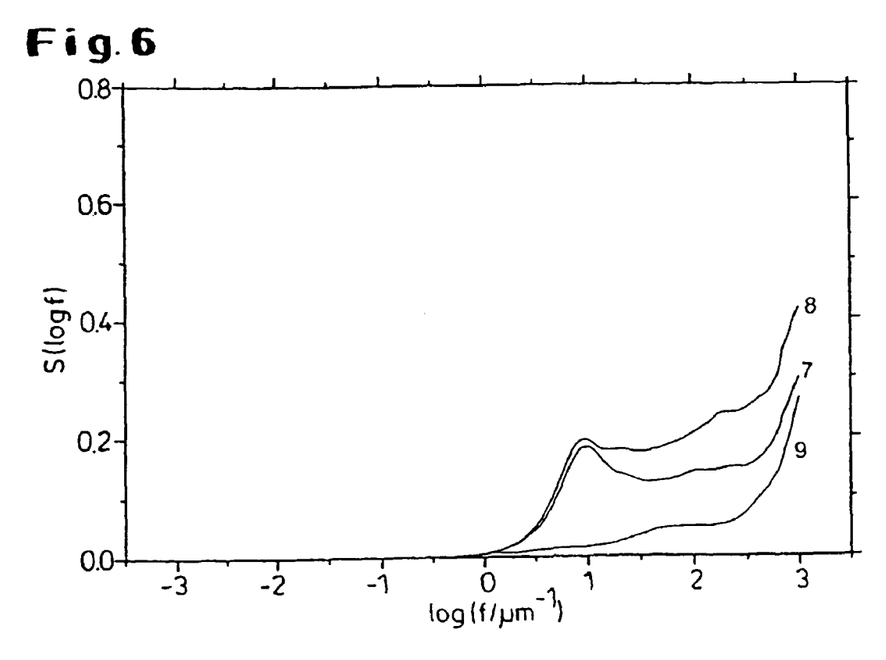
FIG. 6 representation of the frequency-dependent amplitudes a(f) of the Fourier components of surfaces according to the invention of Examples 7-9
Figure 7:
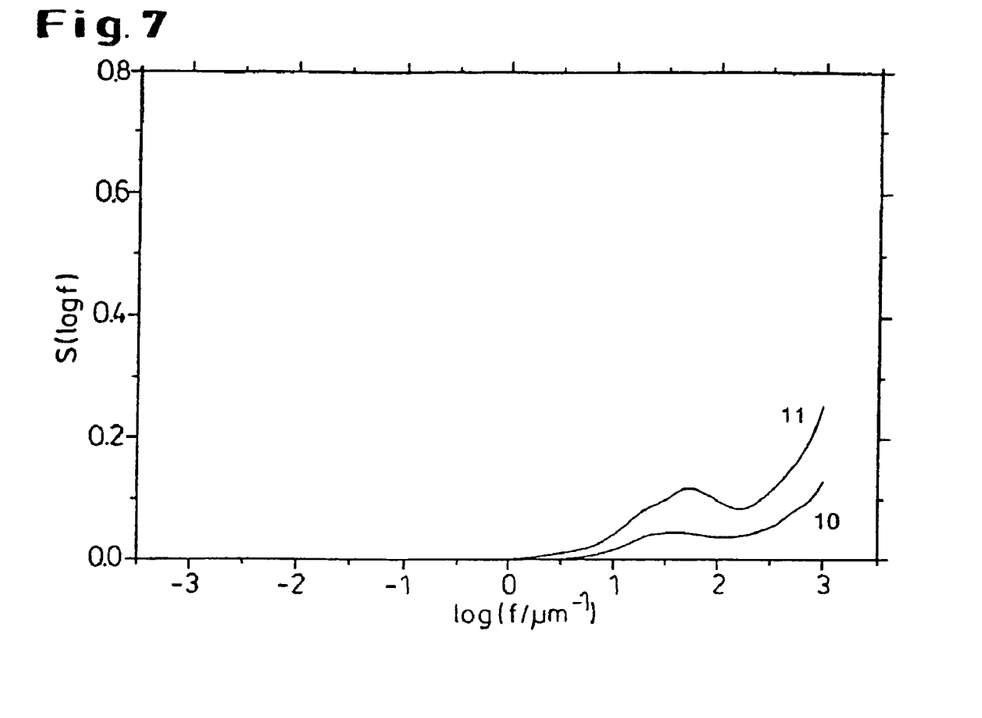
FIG. 7 representation of the frequency-dependent amplitudes a(f) of the Fourier components of surfaces according to the invention of Examples 10-11
Figure 8:
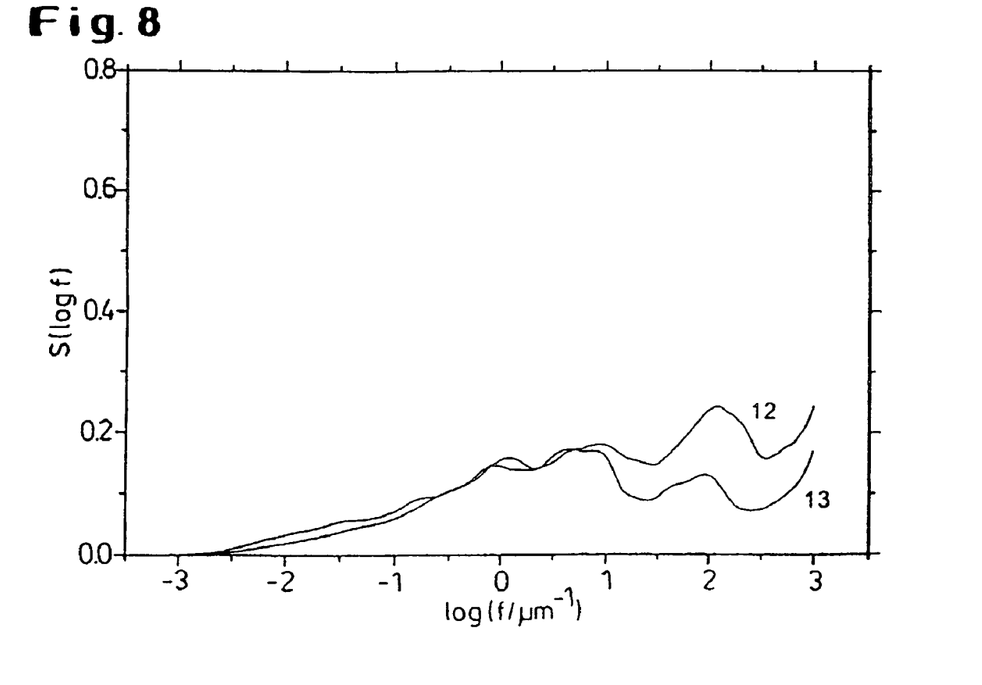
FIG. 8 representation of the frequency-dependent amplitudes a(f) of the Fourier components of surfaces according to the invention of Examples 12-13
Figure 9:
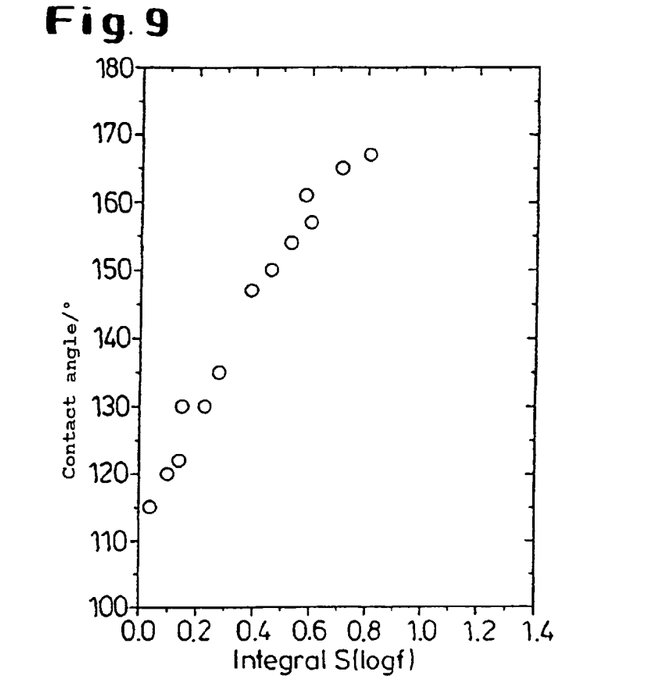
FIG. 9 representation of the water contact angle as a function of the integral of the function S(log f)=a(f)·f calculated between the integration limits $\log(f_1/\mu m^{-1})=-3$ and $\log(f_2/\mu m^{-1})=3$ for the various example surfaces 1-13
Figure 10:
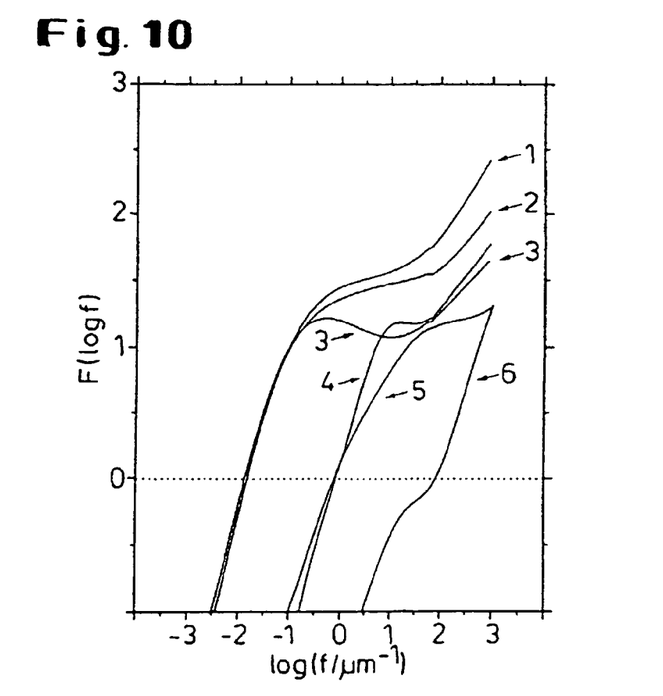
FIG. 10 frequency-dependent amplitudes a(f) of the Fourier components of surfaces according to the invention of Examples 1-6 in the form F(log f) in log-log representation (corresponding to the representation in German Application DE 19860136.0).
Figure 11:
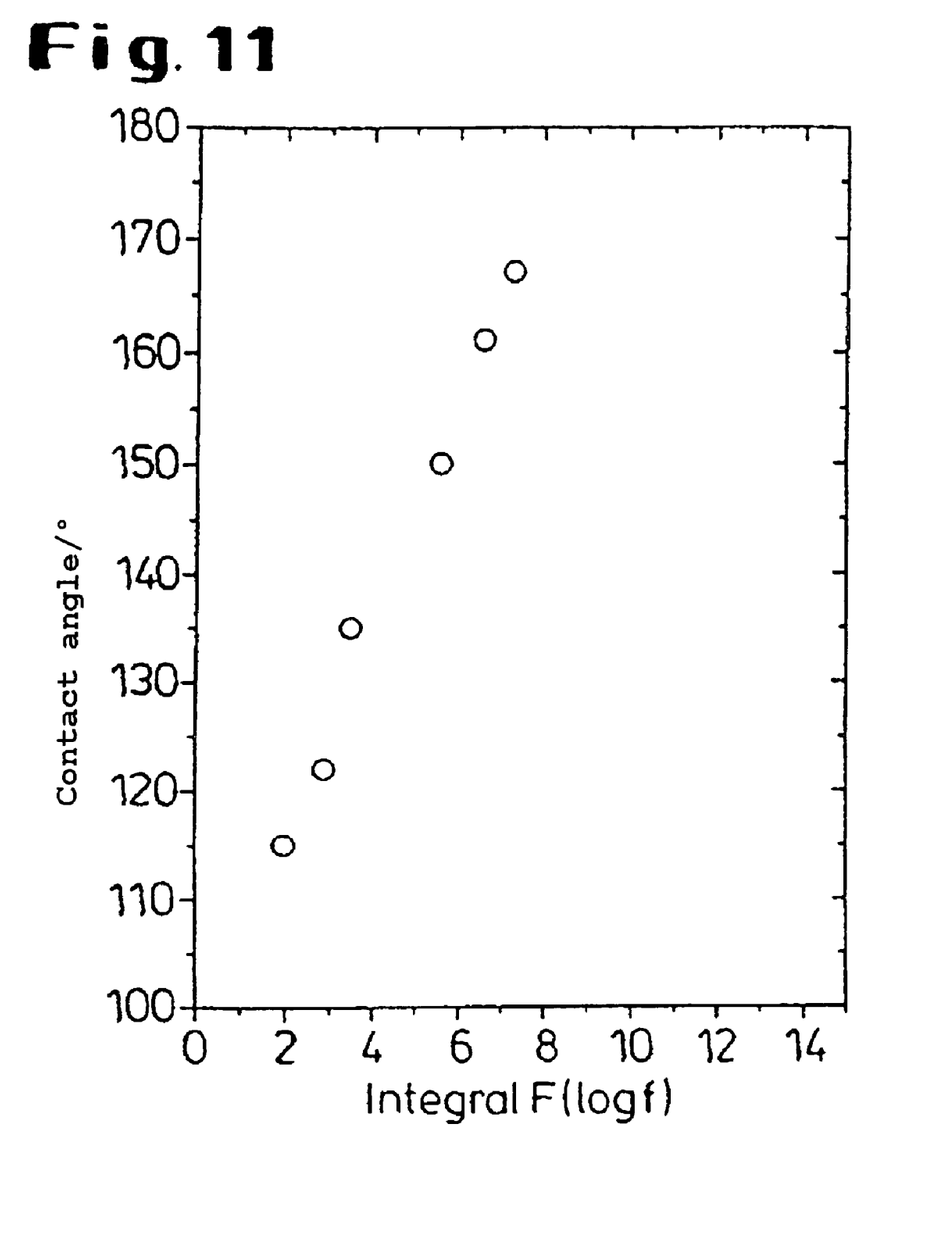
FIG. 11 representation of the water contact angle as a function of the integral of the function F(log f) calculated in the range of positive values of F in the interval $\log(f_1/\mu m^{-1})=-3$ and $\log(f_2/\mu m^{-1})=3$ for the various example surfaces 1-6 (corresponding to the representation in German Application DE 19860136.0).

In order to show the comparability of the two descriptions (1) and (2), Examples 1-6 are given at the end in FIGS. 10 and 11 additionally with the help of the function F, as in Patent Application DE 19860136.0.

The invention is illustrated below in the examples with reference to figures.

EXAMPLES

General Preliminary Remarks Regarding the Examples

1. Determination of the Surface Topography

To determine the surface topography, the surface was analysed using a scanning tunnelling microscope, using a scanning atomic force microscope, using white light interferometry and using angle-resolved light scattering.

For the scanning tunnelling microscopy, a Nanoscope III, Digital Instruments, Santa Barbara, Calif. was used, which was operated in the constant flow mode. The measurement was carried out in air at room temperature using a mechanically drawn platinum-iridium tip. The scan areas $L^2$ used were, successively, the areas 500×500 nm², 200×200 nm² and 50×50 nm² where in each case $N^2$=512×512 datapoints in step sizes ΔL=N/L.

The height profile data are converted to the averaged power spectral density PSD in accordance with equations 1 and 2 from the publication by C. Ruppe and A. Duparré, Thin Solid Films, 288, (1996), page 9.

Scanning atomic force microscopy was carried out using a DIMENSION 3000 scanning atomic force microscope from Digital Instruments, Santa Barbara, USA in contact mode. The measurement is carried out in air at room temperature. The Si tip has a radius of about 10 nm. The scan areas $L^2$ used are, successively, the areas 1×1 µm², 10×10 µm² and 50×50 µm² where in each case $N^2$=512×512 datapoints in step sizes ΔL=N/L.

For the white light interferometry, a LEICA DMR microscope from Leica, Wetzlar was used. The measurement fields were 140×140 µm², 280×2800 µm², 1120×1120 µm² and 2800×2800 µm² with in each case 512×512 datapoints.

The PSD(Δf) curves obtained using the abovementioned measurement methods were then combined to give a single PSD(f) curve and plotted log-log according to FIGS. 1-4, where the power spectral density PSD in nm⁴ and the spatial frequency f in µm⁻¹ was made dimensionless.

2. Calculation of the Frequency-Dependent Amplitudes a(f):

The frequency-dependent amplitudes a(f) are determined from the PSD(f) curves according to the following formula.

$$a(f) = \sqrt{4\pi \int_{f_1/\sqrt{D}}^{f\sqrt{D}} PSD(f') f' df'} \approx 2f\sqrt{\pi PSD(f) \log D}$$

In all cases, the constant D, which determines the integration interval width and within which the function PSD(f) is regarded as constant, used here was the value D=1.5.

This formula corresponds in principle to the calculation of spatial-frequency-dependent amplitudes, which is also described in J. C. Stover, Optical Scattering, 2nd Edition, SPIE Press Bellingham, Wash., USA 1995 in formula (4.19) on page 103, and in Table 2.1 on page 34 and Table 2.2 on page 37.

Example 1

A roll-polished AlMg3 sheet with an area of 35×35 mm² and a thickness of 0.5 mm was degreased with distilled chloroform, then for 20 s in aqueous NaOH (5 g/l) at 50° C.

The sheet was then prepickled for 20 s in $H_3PO_4$ (100 g/l), rinsed for 30 s in distilled water and electrochemically pickled for 90 s in a mixture of $HCl/H_3BO_3$ (in each case 4 g/l) at 35° C. and 120 mA/cm at an alternating voltage of 35 V.

After the sheet had been rinsed in distilled water for 30 s and alkaline-rinsed in aqueous NaOH (5 g/l) for 30 s, it was again rinsed in distilled water for 30 s and then anodically oxidized for 90 s in $H_2SO_4$ (200 g/l) at 25° C. with 30 mA/cm² at a direct voltage of 50 V.

The sheet was then rinsed for 30 s in distilled water, then for 60 s at 40° C. in $NaHCO_3$ (20 g/l), then again for 30 s in distilled water and dried for 1 hour at 80° C. in a drying cabinet.

The sheet treated in this way was coated with an approximately 50 nm-thick gold layer by atomization. The sample was then coated for 24 hours by immersion in a solution of n-decanethiol in ethanol (1 g/l) at room temperature in a sealed vessel, then rinsed with ethanol and dried.

The surface has a static contact angle for water of 167°. A drop of water of volume 10 µl rolls off if the surface is inclined by <10°.

The surface topography of this surface was analysed as described in "1. Determination of the surface topography", and the measurement data obtained [lacuna] plotted as curve 1 in FIG. 1.

The integral of the normalized Fourier amplitudes S(log f), calculated between integration limits $\log(f_1/\mu m^{-1})=-3$ and $\log(f_2/\mu m^{-1})=3$, is 0.81.

Example 2

In this example an AlMg3 sheet was treated and coated exactly as in Example 1, although in addition, prior to the gold coating, the sheet was etched for 20 s in 1 M NaOH, then rinsed for 30 s in distilled water, then in ethanol and dried for 1 hour at 80° C. in a drying cabinet.

The surface has a static contact angle for water of 161°. A drop of water of volume 10 µl rolls off if the surface is inclined by <10°.

The surface topography of this surface was analysed as described in "1. Determination of the surface topography", and the measurement data obtained [lacuna] plotted as curve 2 in FIG. 1.

The integral of the normalized Fourier amplitudes S(log f), calculated between integration limits $\log(f_1/\mu m^{-1})=-3$ and $\log(f_2/\mu m^{-1})=3$, is 0.58.

Comparative Example 3

In this example an AlMg3 sheet was treated and coated exactly as in Example 2, although it was etched for 120 s in 1 M NaOH.

The surface has a static contact angle for water of 150°. A drop of water of volume 10 µl does not roll off if the surface is inclined by <10°.

The surface topography of this surface was analysed as described in "1. Determination of the surface topography", and the measurement data obtained [lacuna] plotted as curve 1 in FIG. 3.

The integral of the normalized Fourier amplitudes S(log f), calculated between integration limits $\log(f_1/\mu m^{-1})=-3$ and $\log(f_2/\mu m^{-1})=3$, is 0.46.

Comparative Example 4

In this example a 35×35 mm² polycarbonate substrate of thickness 1 mm was coated with a 200 nm-thick aluminium layer for atomization. The sample was then treated for 30 minutes in distilled water at 100° C., then rinsed in distilled water at room temperature for 30 s and dried for 1 hour at 80° C. in a drying cabinet.

The sample treated in this way was coated with an approximately 50 nm-thick gold layer by atomization. Finally, the sample was coated for 24 hours by immersion in a solution of n-decanethiol in ethanol (1 g/l) at room temperature in a sealed vessel, then rinsed with ethanol and dried.

The surface has a static contact angle for water of 135°. A drop of water of volume 10 µl does not roll off if the surface is inclined by <10°.

The surface topography of this surface was analysed as described in "1. Determination of the surface topography", and the measurement data obtained [lacuna] plotted as curve 4 in FIG. 1.

The integral of the normalized Fourier amplitudes S(log f), calculated between integration limits $\log(f_1/\mu m^{-1})=-3$ and $\log(f_2/\mu m^{-1})=3$, is 0.28.

Comparative Example 5

In this example a roll-polished AlMg3 sheet with an area of 35×35 mm² and a thickness of 0.5 mm was degreased with distilled chloroform. After rinsing in distilled water for 30 s, the sheet was then anodically oxidized for 600 s in $H_2SO_4$ (200 g/l) at 20° C. with 10 mA/cm² at a direct voltage of 35 V. The sheet was then rinsed in distilled water and dried for 1 hour at 80° C. in a drying cabinet.

The sheet treated in this way was coated with an approximately 50 nm-thick gold layer by atomization. The sample was then coated for 24 hours by immersion in a solution of n-decanethiol in ethanol (1 g/l) at room temperature in a sealed vessel, then rinsed with ethanol and dried.

The surface has a static contact angle for water of 122°. A drop of water of volume 10 µl does not roll off if the surface is inclined by <10°.

The surface topography of this surface was analysed as described in "1. Determination of the surface topography", and the measurement data obtained [lacuna] plotted as curve 5 in FIG. 1.

The integral of the normalized Fourier amplitudes S(log f), calculated between integration limits $\log(f_1/\mu m^{-1})=-3$ and $\log(f_2/\mu m^{-1})=3$, is 0.14.

Comparative Example 6

An untreated polished monocrystalline Si wafer was coated with 200 nm of gold by vapour deposition, and the sample was coated for 24 hours by immersion in a solution of n-decanethiol in ethanol (1 g/l) at room temperature in a sealed vessel, then rinsed with ethanol and dried.

The surface has a static contact angle for water of 115°. A drop of water of volume 10 µl does not roll off if the surface is inclined by <10°.

The surface topography of this surface was analysed as described in "1. Determination of the surface topography", and the measurement data obtained [lacuna] plotted as curve 6 in FIG. 1.

The integral of the normalized Fourier amplitudes S(log f), calculated between integration limits $\log(f_1/\mu m^{-1})=-3$ and $\log(f_2/\mu m^{-1})=3$, is 0.04.

Comparative Example 7

In this example a 35×35 mm² polycarbonate substrate of thickness 1 mm was coated with a 100 nm-thick aluminium layer for atomization. The sample was then treated for 3 minutes in distilled water at 100° C., then rinsed in distilled water at room temperature for 30 s and dried for 1 hour at 80° C. in a drying cabinet.

The sample treated in this way was coated with an approximately 100 nm-thick gold layer by atomization. Finally, the sample was coated for 24 hours by immersion in a solution of n-decanethiol in ethanol (1 g/l) at room temperature in a sealed vessel, then rinsed with ethanol and dried.

The surface has a static contact angle for water of 147°. A drop of water of volume 10 µl does not roll off if the surface is inclined by <10°.

The surface topography of this surface was analysed as described in "1. Determination of the surface topography", and the measurement data obtained [lacuna] plotted as curve 1 in FIG. 2.

The integral of the normalized Fourier amplitudes S(log f), calculated between integration limits $\log(f_1/\mu m^{-1})=-3$ and $\log(f_2/\mu m^{-1})=3$, is 0.39.

Example 8

In this example a sample was prepared exactly as in Example 7. However, in contrast to Example 7, the gold layer used had a thickness of 50 nm.

The surface has a static contact angle for water of 154°. A drop of water of volume 10 µl rolls off if the surface is inclined by <10°.

The surface topography of this surface was analysed as described in "1. Determination of the surface topography", and the measurement data obtained [lacuna] plotted as curve 2 in FIG. 2.

The integral of the normalized Fourier amplitudes S(log f), calculated between integration limits $\log(f_1/\mu m^{-1})=-3$ and $\log(f_2/\mu m^{-1})=3$, is 0.53.

Comparative Example 9

In this example a roll-polished AlMg3 sheet with an area of 35×35 mm² and a thickness of 0.5 mm was degreased with distilled chloroform. The sample was then treated for 20 s in distilled water at 100° C. The sheet was then rinsed in ethanol and dried for 1 hour at 80° C. in a drying cabinet.

The sheet treated in this way was coated with an approximately 50 nm-thick gold layer by atomization. The sample was then coated for 24 hours by immersion in a solution of n-decanethiol in ethanol (1 g/l) at room temperature in a sealed vessel, then rinsed with ethanol and dried.

The surface has a static contact angle for water of 130°. A drop of water of volume 10 µl does not roll off if the surface is inclined by <10°.

The surface topography of this surface was analysed as described in "1. Determination of the surface topography", and the measurement data obtained [lacuna] plotted as curve 3 in FIG. 2.

The integral of the normalized Fourier amplitudes S(log f), calculated between integration limits $\log(f_1/\mu m^{-1})=-3$ and $\log(f_2/\mu m^{-1})=3$, is 0.15.

Comparative Example 10

In this example a polished monocrystalline Si(100) wafer was coated with the layer sequence substrate-HLHL (H=LaF$_3$, L=MgF$_2$) by electron beam vaporization at a substrate temperature of 520 K. The individual layer thicknesses used were, for H, a thickness of 100 nm, and, for L, a thickness of 116 nm. The preparation corresponds to the publication by S. Jakobs, A. Duparré and H. Truckenbrodt, Applied Optics 37, 1180 (1998).

The sample treated in this way was coated with an approximately 50 nm-thick gold layer by atomization. Finally, the sample was coated for 24 hours by immersion in a solution of n-decanethiol in ethanol (1 g/l) at room temperature in a sealed vessel, then rinsed with ethanol and dried.

The surface has a static contact angle for water of 120°. A drop of water of volume 10 µl does not roll off if the surface is inclined by <10°.

The surface topography of this surface was analysed as described in "1. Determination of the surface topography", and the measurement data obtained [lacuna] plotted as curve 1 in FIG. 3.

The integral of the normalized Fourier amplitudes S(log f), calculated between integration limits $\log(f_1/\mu m^{-1})=-3$ and $\log(f_2/\mu m^{-1})=3$, is 0.10.

Comparative Example 11

In this example a sample was prepared as in Example 10. However, instead of substrate-(HL)², the layer sequence here is substrate-(HL)⁸.

The surface has a static contact angle for water of 130°. A drop of water of volume 10 µl does not roll off if the surface is inclined by <10°.

The surface topography of this surface was analysed as described in "1. Determination of the surface topography", and the measurement data obtained [lacuna] plotted as curve 2 in FIG. 3.

The integral of the normalized Fourier amplitudes S(log f), calculated between integration limits $\log(f_1/\mu m^{-1})=-3$ and $\log(f_2/\mu m^{-1})=3$, is 0.23.

Example 12

In this example a sample was prepared in the same manner as described in the unpublished German patent application with the file reference 19935326.3. Cyclo-{SiO (CH$_3$)[(CH$_2$)$_2$Si(OH)(CH$_3$)$_2$]}$_4$ (below: D4-silanol) was prepared as described in DE 196 03 241.

4.1 g of AEROSIL® R 812 (Degussa) are dispersed in 28.5 g of 1-methoxy-2-propanol, 5.0 g of D4-silanol and 6.5 g of tetraethoxysilane. 1.1 g of 0.1 N p-toluenesulphonic acid are added thereto, and the mixture is stirred for one hour at room temperature (23° C.). The resulting coating solution is then applied to glass using a film-drawing frame in a wet-film thickness of 120 µm. After the volatile constituents had evaporated off at room temperature, the coating was cured in a convection drying cabinet at 130° C. for one hour in a convection drying cabinet.

The sample treated in this way was coated with an approximately 50 nm-thick gold layer by atomization. Finally, the sample was coated for 24 hours by immersion in a solution of n-decanethiol in ethanol (1 g/l) at room temperature in a sealed vessel, then rinsed with ethanol and dried.

The surface has a static contact angle for water of 165°. A drop of water of volume 10 µl rolls off if the surface is inclined by <10°.

The surface topography of this surface was analysed as described in "1. Determination of the surface topography", and the measurement data obtained [lacuna] plotted as curve 1 in FIG. 4.

The integral of the normalized Fourier amplitudes S(log f), calculated between integration limits $\log(f_1/\mu m^{-1})=-3$ and $\log(f_2/\mu m^{-1})=3$, is 0.71.

Example 13

In this example a sample was prepared as in Example 12, where, instead of the addition of 1.1 g of p-toluenesulphonic acid, 2.3 g of HCl were added here.

The surface has a static contact angle for water of 157°. A drop of water of volume 10 µl rolls off if the surface is inclined by <10°.

The surface topography of this surface was analysed as described in "1. Determination of the surface topography", and the measurement data obtained [lacuna] plotted as curve 2 in FIG. 4.

The integral of the normalized Fourier amplitudes S(log f), calculated between integration limits $\log(f_1/\mu m^{-1})=-3$ and $\log(f_2/\mu m^{-1})=3$, is 0.60.

Example 14

Negative Moulding:

In this example a negative impression of an ultraphobic surface is prepared using a polymer solution. The mould used is the surface obtained in Example 1.

An approximately 20 µm-thick film of poly(methyl methacrylate-co-perfluoroocta-decyl methacrylate) ($-[CH_2-C(COOCH_3)CH_3]_n$-co-$[CH_2-C(COOC_{18}F_{37})CH_3]_m-$, where the n/m ratio is =10; 50% strength by weight solution in butanone) was poured onto this mould surface using a film-drawing frame, where 30% of the polymer was dissolved in methylene chloride. After drying at room temperature, a 10 mm-wide strip was cut free from the film using a scalpel, strengthened from the topside using Sellotape and removed from the mould.

The underside, which was the contact side to the mould, was coated with an approximately 50 nm-thick gold layer by atomization. Finally, the sample was coated for 24 hours by vapour deposition with n-decanethiol vapour at room temperature in a sealed vessel, then rinsed with ethanol and dried.

The surface has a static contact angle for water of 165°. A drop of water of volume 10 µl rolls off if the surface is inclined by <10°.

Example 15

Positive Moulding:

In this example a positive impression of an ultraphobic surface is prepared using a polymer solution. The mould used is the surface obtained in Example 1.

Step 1: Preparation of a Negative Impression of the Ultraphobic Mould Surface

An approximately 100 µm-thick film of bisphenol A polycarbonate ($M_n$=10 000) was poured onto the mould surface from a 50% strength by weight solution in methylene chloride using a film-drawing frame. After drying at room temperature, a 20 mm-wide strip was cut free from the film using a scalpel, from the topside using strengthened Sellotape and removed from the mould.

The underside (originally facing the mould) of the film was coated with an approximately 50 nm-thick gold layer by atomization. The gold layer of the sample was then coated for 24 hours with a few drops of a solution of n-perfluorooctanethiol in α,α,α-trifluorotoluene (1 g/l) at room temperature in a sealed vessel, then rinsed with α,α,α-trifluorotoluene and dried.

Step 2: Moulding the Negative Impression of the Original Surface with a Polymer Mixture which Contains an Oleophobic Polymer as Additive An approximately 20 µm-thick film of polystyrene ($M_n$=15 000) containing about 10% by weight of poly (methyl methacrylate-co-perfluorooctadecyl methacrylate) ($-[CH_2-C(COOCH_3)CH_3]_n$-co-$[CH_2-C(COOC_{18}F_{37})CH_3]_m-$; n/m=10) was poured onto this mould surface using a casting frame, where 30% of the polymer mixture was dissolved in methylene chloride. After slowly drying at room temperature (about 10 h), a 10 mm-wide strip was cut free from the film using a scalpel, strengthened from the topside using Sellotape and removed from the mould.

The underside, which was the contact side to the mould, was coated with an approximately 50 nm-thick gold layer by atomization. Finally, the sample was coated for 24 hours by vapour deposition with n-decanethiol vapour at room temperature in a sealed vessel, then rinsed with ethanol and dried.

The surface has a static contact angle for water of 164°. A drop of water of volume 10 µl rolls off if the surface is inclined by <10°.

Table 1 summarizes once again the results of the examples according to the invention and of the comparative examples.

It is clear that only in the case of ultraphobic surfaces for which the contact angle of a water drop on the surface is >150° is the integral of the curve a(f)·f=S(log f), calculated between integration limits $\log(f_1/\mu m^{-1})=-3$ and $\log(f_2/\mu m^{-1})=3$, greater than or equal to 0.5.

A positive or negative impression of such an ultraphobic surface likewise produces a contact angle >150°.

TABLE 1

|  | Contact angle | Integral |
| --- | --- | --- |
| Example 1 | 167° | 0.81 |
| Example 2 | 161° | 0.58 |
| Comparative Example 3 | 150° | 0.46 |

TABLE 1-continued

|  | Contact angle | Integral |
| --- | --- | --- |
| Comparative Example 4 | 135° | 0.28 |
| Comparative Example 5 | 122° | 0.14 |
| Comparative Example 6 | 115° | 0.04 |
| Comparative Example 7 | 147° | 0.39 |
| Example 8 | 154° | 0.53 |
| Comparative Example 9 | 130° | 0.15 |
| Comparative Example 10 | 120° | 0.10 |
| Comparative Example 11 | 130° | 0.23 |
| Example 12 | 165° | 0.71 |
| Example 13 | 157° | 0.60 |
| Example 14 | 165° | not determined |
| Example 15 | 164° | not determined |

The invention claimed is:

1. A surface having ultraphobic properties, comprising a surface topography in which the value of the integral of a function S $$S(\log f) = a(f) \cong f \tag{1}$$

which gives a relationship between the spatial frequencies f of the individual Fourier components and their amplitudes a(f), is at least 0.5 between the integration limits $\log(f_1/\Phi m^{-1})=-3$ and $\log(f_2/\Phi m^{-1})=3$, wherein said surface comprises a hydrophobic or oleophobic material, or is coated with a hydrophobic or oleophobic material.

2. The surface according to claim 1, wherein the integral is >0.6.

3. The surface according to claim 1, wherein said surface has a contact angle of at least 150° and a roll-off angle of <10°.

4. The surface according to claim 1, wherein said surface has a contact angle of at least 155°.

5. The surface according to claim 1, wherein said surface comprises metal, plastic, glass or ceramic.

6. The surface according to claim 1, wherein said surface comprises metal selected from the group consisting of beryllium, magnesium, scandium, titanium, vanadium, chromium, manganese, iron, cobalt, nickel, copper, zinc, aluminum, gallium, yttrium, zirconium, niobium, molybdenum, technetium, ruthenium, rhenium, palladium, silver, cadmium, indium, tin, lanthanum, cerium, praseodymium, neodymium, samarium, europium, gadolinium, terbium, dysprosium, holmium, erbium, thulium, ytterbium, lutetium, hafnium, tantalum, tungsten, rhenium, osmium, iridium, platinum, gold, thallium, lead, bismuth, titanium, aluminium, magnesium, nickel and alloys thereof.

7. The surface according to claim 1, wherein said surface comprises an aluminium-magnesium alloy.

8. The surface according to claim 1, wherein said surface comprises a thermosetting or thermoplastic polymer.

9. The surface according to claim 1, wherein said surface comprises a thermosetting polymer selected from the group consisting of diallyl phthalate resins, epoxy resins, urea-formaldehyde resin, melamine-formaldehyde resin, melamine-phenol-formaldehyde resin, phenol-formaldehyde resin, polyimides, silicone rubbers, unsaturated polyester resins and mixtures thereof.

10. The surface according to claim 1, wherein said surface comprises a coating of a hydrophobic phobicization auxiliary.

11. Material or construction material comprising an ultraphobic surface according to claim 1.

12. A friction-reducing lining of vehicle bodies, aircraft fuselages or hulls of ships comprising the ultraphobic surface as claimed in claim 1.

13. A self-cleaning coating or panelling of building structures, roofs, windows, ceramic construction material comprising the ultraphobic surface claimed in claim 1.

14. The self-cleaning coating or panelling of building structures, roofs, windows, ceramic construction material claimed in claim 13 for sanitary installations and household appliances.

15. An antirust coating of metal objects comprising the ultraphobic surface claimed in claim 1.

16. A transparent sheet or a topcoat of transparent sheets comprising the ultraphobic surface claimed in claim 1.

17. The transparent sheet of claim 16 used as a sheet or top-coating in glass or plastic.

18. The transparent sheet of claim 16 used as a sheet or top-coating for solar cells, vehicles, or greenhouses.

19. Process for the preparation of a surface having ultraphobic properties according to claim 1 based on an $AlMg_3$ alloy, comprising cleaning, pickling, anodically oxidating, passivating in boiling water, and optionally coating with a noble metal as an adhesion promoter, and coating with a hydrophobic material.

20. The process of claim 19, wherein the noble metal coating is gold with a layer thickness of from 10 to 100 nm.

21. The process of claim 20, wherein the coating is prepared by atomization.

22. The process of claim 19, wherein the hydrophobic material is a phobicization auxiliary selected form the group consisting of anionic, cationic, amphoteric, and nonionic interface active compounds.

23. The surface according to claim 1, wherein said surface comprises a thermoplastic polymer selected from the group consisting of polyolefins, polypropylene, polyethylene, polycarbonates, polyester carbonates, polyesters, PBT, PET, polystyrene, styrene copolymers, SAN resin, rubber-containing styrene graft copolymers, ABS polymer, polyamides, polyurethanes, polyphenylene sulphide, polyvinyl chloride and mixtures thereof.

24. The surface according to claim 1, wherein said surface comprises a coating of a hydrophobic phobicization auxiliary which comprises a group which is an anionic, cationic, amphoteric or nonionic, interface active group.

25. The surface according to claim 1, wherein said surface comprises $AlMg_3$.

26. A surface having ultraphobic properties, comprising a surface topography in which the value of the integral of a function S $$S(\log f) = a(f) \cong f \tag{1}$$

which gives a relationship between the spatial frequencies F of the individual Fourier components and their amplitudes a(f), is at least 0.5 between the integration limits $\log(f_1/\mu m^{-1})=-3$ and $\log(f_2/\mu m^{-1})=3$, wherein said surface comprises a hydrophobic material, or is coated with a hydrophobic material.

27. A surface having ultraphobic properties, comprising a surface topography in which the value of the integral of a function S $$S(\log f) = a(f) \cong f \tag{1}$$

which gives a relationship between the spatial frequencies F of the individual Fourier components and their amplitudes a(f), is at least 0.5 between the integration limits $\log(f_1/\mu m^{-1})=-3$ and $\log(f_2/\mu m^{-1})=3$, wherein said surface comprises an oleophobic material, or is coated with an oleophobic material.

* * * * *